(12) United States Patent
Bandhauer (10) Patent No.: US 8,120,521 B2
(45) Date of Patent: Feb. 21, 2012

(54) RADAR ECHOLOCATER WITH AUDIO OUTPUT

(75) Inventor: Brian D. Bandhauer, Boise, ID (US)

(73) Assignee: Preco Electronics, Inc., Boise, ID (US)

( * ) Notice: Subject to any disclaimer, the term of this patent is extended or adjusted under 35 U.S.C. 154(b) by 1619 days.

(21) Appl. No.: 10/977,190

(22) Filed: Oct. 28, 2004

(65) Prior Publication Data
US 2009/0322616 A1    Dec. 31, 2009

Related U.S. Application Data (60) Provisional application No. 60/514,965, filed on Oct. 28, 2003.

(51) Int. Cl.
 G01S 13/04     (2006.01)
 G01S 13/56     (2006.01)
 G01S 13/86     (2006.01)
(52) U.S. Cl. .......... 342/24; 342/27; 342/28; 342/52
(58) Field of Classification Search ............ 342/24, 342/27, 28, 52
See application file for complete search history.

(56) References Cited

U.S. PATENT DOCUMENTS

| | | | |
|---|---|---|---|
| 3,366,922 A * | 1/1968 | Kay ............... | 367/102 |
| 3,385,159 A * | 5/1968 | Bliss et. al. ............ | 356/4.05 |
| 3,626,416 A | 12/1971 | Rabow ............... | 343/113 R |
| 3,896,435 A * | 7/1975 | Constant ............... | 342/109 |
| 3,940,769 A | 2/1976 | Sherman et al. ........ | 343/113 R |
| 4,280,204 A | 7/1981 | Elchinger ............... | 367/116 |
| 4,761,770 A | 8/1988 | Kim et al. ............... | 367/116 |
| 5,107,467 A | 4/1992 | Jorgensen et al. ...... | 367/116 |
| 5,345,471 A | 9/1994 | McEwan ............... | 375/1 |
| 5,361,070 A | 11/1994 | McEwan ............... | 342/21 |
| 5,521,600 A * | 5/1996 | McEwan ............... | 342/27 |
| 5,661,385 A | 8/1997 | McEwan ............... | 318/478 |
| 5,818,381 A * | 10/1998 | Williams ............... | 342/24 |
| 6,191,724 B1 * | 2/2001 | McEwan ............... | 342/21 |
| 6,230,139 B1 * | 5/2001 | Hara et al. ............... | 704/276 |
| 6,351,732 B2 * | 2/2002 | Hara et al. ............... | 704/276 |
| 6,414,627 B1 * | 7/2002 | McEwan ............... | 342/134 |
| 6,469,956 B1 | 10/2002 | Zeng ............... | 367/116 |
| 6,489,605 B1 | 12/2002 | Ritz et al. ............... | 250/221 |

(Continued)

FOREIGN PATENT DOCUMENTS

| | | | |
|---|---|---|---|
| EP | 669119 A1 * | 8/1995 | |
| JP | 58044370 A * | 3/1983 | |

*Primary Examiner* — John Sotomayor
(74) *Attorney, Agent, or Firm* — Pedersen and Company, PLLC; Ken J. Pedersen; Barbara S. Pedersen (57) ABSTRACT

The echolocater device described herein incorporates the features of integrated sampling radar technology to create a unique device that provides, for example, the visually impaired with an excellent new tool to help navigate the world. Much like a bat using its bio-sonar, the visually impaired will be able to hear subtle differences in audio-replicated radar echoes. In one preferred embodiment of the invention, two integrated-sampling type radar receivers are spaced some convenient distance apart. A single transmitter centered between two receivers transmits pulses of an RF carrier. Audio "IF" output from each receiver is processed and sent to a small speaker worn near each ear. With practice the user of this invention will be able to discern the range, location and motion of individual objects, and may also be able to distinguish particular echo characteristics of differing objects.

5 Claims, 5 Drawing Sheets

U.S. PATENT DOCUMENTS

| | | | |
|---|---|---|---|
| 6,671,226 B1 | 12/2003 | Finkel et al. | 367/116 |
| 6,710,706 B1 | 3/2004 | Withington et al. | 340/407.1 |
| 2001/0016818 A1* | 8/2001 | Hara et al. | 704/500 |
| 2005/0164643 A1* | 7/2005 | McEwan | 455/67.15 |

* cited by examiner

Figure 1

(Prior Art)

RADAR ECHOLOCATER WITH AUDIO OUTPUT

This application claims priority from prior, co-pending U.S. Provisional Application No. 60/514,965, filed Oct. 28, 2003 by the same inventor, and entitled "Radar Visual Assistance Device", which application is herein incorporated by reference.

BACKGROUND OF THE INVENTION

1. Field of the Invention

This invention relates generally to radar ("radio detection and ranging"), and more specifically relates to down-converting reflected radio-frequency energy to audio output. One application of the invention is, for example, using radar to assist the visually impaired.

A method of frequency down-converting a radio frequency (RF) carrier termed ultra-wide-band ('UWB') was invented by McEwan et al. at Lawrence Livermore National Laboratories (LLNL) years ago (See U.S. Pat. Nos. 5,345,471, 5,361,070, and 5,661,385). This technique, herein termed "integrated sampling," is being widely licensed for commercial use of the technique for multiple radar-related purposes. The basis of this integrated sampling technique was originally developed earlier in conjunction with the development of sampling oscilloscope technology. In more modern terms, the technique can be viewed as a form of "digital downconversion" where subsampling is used to alias the original spectrum down to a much lower frequency spectrum. In the case of the LLNL technology, the technique retains much of the older sampling oscilloscope technology in that the sampler is purely analog in nature with no analog-to-digital conversion employed.

The LLNL integrated sampling technique differs from more conventional methods of radar signal processing in that the RF carrier is directly down-converted to an intermediate frequency (IF) without the conventional use of mixer or local oscillator components. As long as the radar echo is consistent during the integrated sampling time period (millions of pulses and samples per second), the time-domain nature of the original RF carrier is accurately duplicated, for example, at the IF frequency, typically selected to be in the audio frequency range. This means that the "nature" of the radar echo is preserved upon down-conversion. The complete amplitude, phase, and Doppler characteristics of the echoed waveform are preserved and time-scaled, including propagation delay. Thus, by this technique, the speed of light propagation of the RF carrier scales down to approximately speed-of-sound delays when down-converted via integrated sampling.

2. Related Art

U.S. Pat. No. 3,626,416 (Rabow): This patent mentions conversion of received RF signals in two receivers to audio for presentation to human ears.
  The patent mentions only heterodyning conversion;
  The patent discloses only direction finding for an external radio frequency source, and does not mention radar echoes; and,
  The patent does not mention using the device for visual assistance.
  Relative to the present invention, disadvantages of this disclosed system are:
    Echo time differential to each receiver is at the speed of light, and this differential is maintained throughout the system; and,
    No provision for self-generation of the RF signal, that is, radar echo, is made.

U.S. Pat. No. 3,940,769 (Sherman, et al.): This patent mentions conversion of an RF radar echo into binaural audio for the purposes of allowing an operator to listen to the radar echo.
  The patent discloses a very specific means of processing the two received audio signals in terms of "sum" and "difference" audio channels derived from left side and right side radar receivers. Both channels are presented to each ear with one ear receiving the "sum channel" plus the "difference channel" and the other ear receiving the "sum channel" plus a filtered and inverted "difference channel". The purpose of the patent is to enhance the angular difference in terms of audio amplitude, and a long derivation of proper filtering parameters is made in it;
  The patent does not mention using the technique for visual assistance; and,
  In the patent no specific method of converting the RF signal to audio is made, using the patent phrase "well-known methods of detection, demodulation, or heterodyning."
  Relative to the present invention, disadvantages of this disclosed system are:
    Echo time differential to each receiver is at the speed of light, and this differential is maintained throughout the system; and,
    The signal at each ear is a processed vectoral sum of two audio signals, with the original echo content being perturbed and blended.

U.S. Pat. No. 4,280,204 (Elchinger): This patent mentions use of an ultrasonic device mounted onto a conventional mobility cane for assistance of the blind. The disclosed ultrasonic range finder can be configured for variable range and direction pointing.
  The patent discloses the ultrasonic echo being measured for range, and a separately created tone is sent to the user to indicate range.
  Relative to the present invention, disadvantages of this disclosed system are:
    The original ultrasonic echo is not sent to the user to allow echo content to be used as a part of the information signal;
    The disclosed device is cumbersome in that the user must configure and reconfigure it to point in a desired direction and to set a desired range; and,
    In general, ultrasonic echo location suffers from several drawbacks:
      Limited useful range of less than about 20 feet;
      Poor performance in high wind, rain and snow;
      Subject to ultrasonic noise interference; and,
      Narrow coverage zone for any single transducer.

U.S. Pat. No. 4,761,770 (Kim, et al.): This patent mentions presenting a binaural echo signal to the user's ears using two ultrasonic receivers.
  The signal is "downconverted" from ultrasonic to sub-audio via "bucket-brigade" (BB) circuitry to time-stretch the signal. The original echo is sampled into the BB device at one clock-rate, and then extracted from the BB device using a much slower clock rate.
  The time-stretch is purposely configured to place the downconverted ultrasonic signal into the sub-audio range so that time delays in echoes are stretched to more discernable delays as a function of distance and human ability to discern delay; and,
  The sub-audio signal is then modulated with a white-noise signal to create an audible sound for the user.

Relative to the present invention, disadvantages of this disclosed system are:

The original ultrasonic echo is distorted by the extreme time-stretching to sub-audio and then modulated with white noise. Therefore, the original true echo content is lost; and, The system is based upon ultrasonics and suffers from the general drawbacks of ultrasonics noted above regarding the Elchinger reference.

U.S. Pat. No. 5,107,467 (Jorgensen, et al.): This patent mentions presenting two receivers to provide an echo signal to the user's ears, based upon ultrasonics.

The original echo signal is peak detected and sampled via analog-to-digital conversion. It is then digitally delayed and stretched in accordance with range via a non-linear stretching algorithm. A processed signal called an "echo profile" is recreated at audio frequency via digital-to-analog conversion using the variable clock in accordance with the variable delay and time-stretching algorithm.

Relative to the present invention, disadvantages of this disclosed system are:

The original ultrasonic echo is distorted by peak detector, A/D conversion, and D/A conversion with non-linear time stretching. Therefore, much of original true echo content is lost; and, The system is based upon ultrasonics and suffers from the general drawbacks of ultrasonics noted above regarding the Elchinger and Kim, et al. references.

U.S. Pat. No. 6,671,226 (Finkel, et al.): This patent mentions using multiple ultrasonic range finders positioned at various angles on the chest area of the user to try and cover a broad area.

The signal sent to the user is manufactured based upon echo-range response in each ultrasonic transceiver. Each transceiver is sequentially activated, and if a target is sensed for that transceiver a tone unique to each transceiver is sent to the user.

Relative to the present invention, disadvantages of this disclosed system are:

The original ultrasonic echo is not preserved;

The system is cumbersome due to the large number of transceivers pointing in different directions, with each transceiver having its own tonal output; and, The system is based upon ultrasonics and suffers from the general drawbacks of ultrasonics noted above regarding the Elchinger, Kim, et al., and Jorgensen, et al. references.

SUMMARY OF THE INVENTION

The echolocater device described herein incorporates the features of integrated sampling radar technology to create a unique device that provides, for example, the visually impaired with an excellent new tool to help navigate the world. Although the integrated sampling technique is discussed herein as a preferred embodiment, other conventional means of downconverting the radar signal spectrum to audio could also readily be employed without deviating from the spirit of this invention.

The human brain is very capable of "processing" audio frequencies, and there is likely no group of humans that can process sounds better than the visually impaired. Much like a bat using its bio-sonar, the visually impaired will be able to hear subtle differences in audio-replicated radar echoes.

In one preferred embodiment of the invention, two integrated-sampling type radar receivers are spaced some convenient distance apart. A single transmitter centered between the two receivers transmits pulses of an RF carrier. The complete device may be worn in belt or vest form on a person and is completely portable and low-profile. Audio "IF" output from each receiver is processed and sent to a small speaker worn near each ear. In this manner the radar echoes take on a 3-dimensional quality just as ordinary sound does when played by a stereo sound system. With practice, the user of this invention will be able to discern the range, location and motion of individual objects, and may also be able to distinguish particular echo characteristics of differing objects.

DESCRIPTION OF THE PREFERRED EMBODIMENTS

Figure 1:
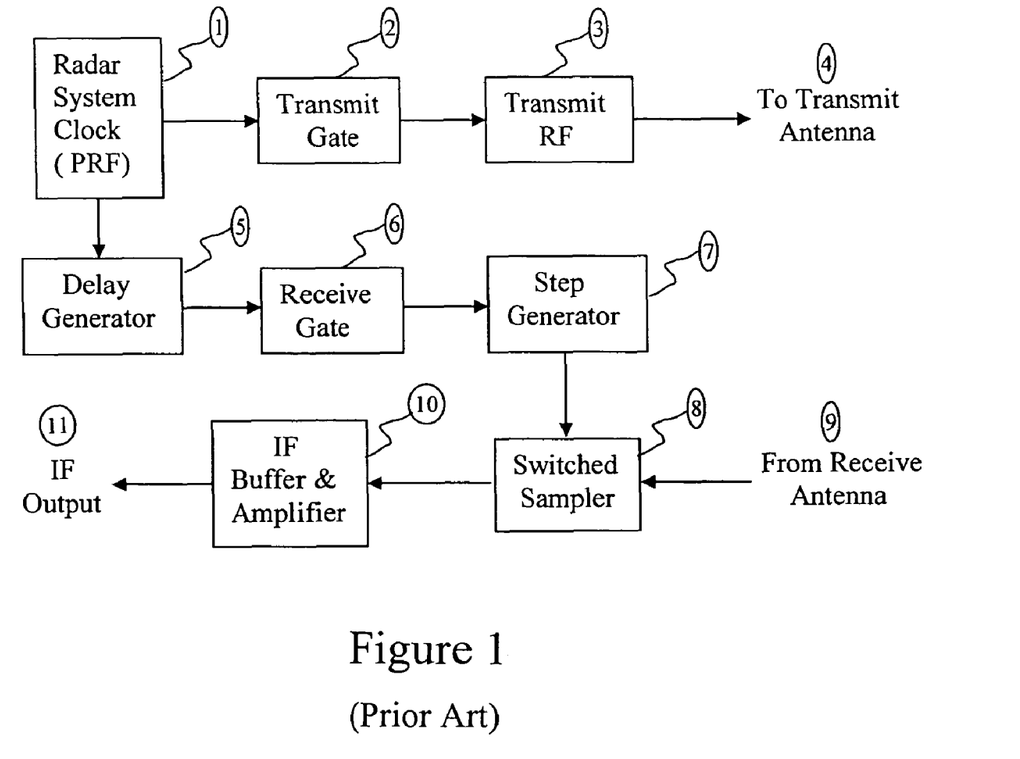
FIG. 1: Functional block diagram of LLNL licensed integrated-sampling based radar.
Figure 2:
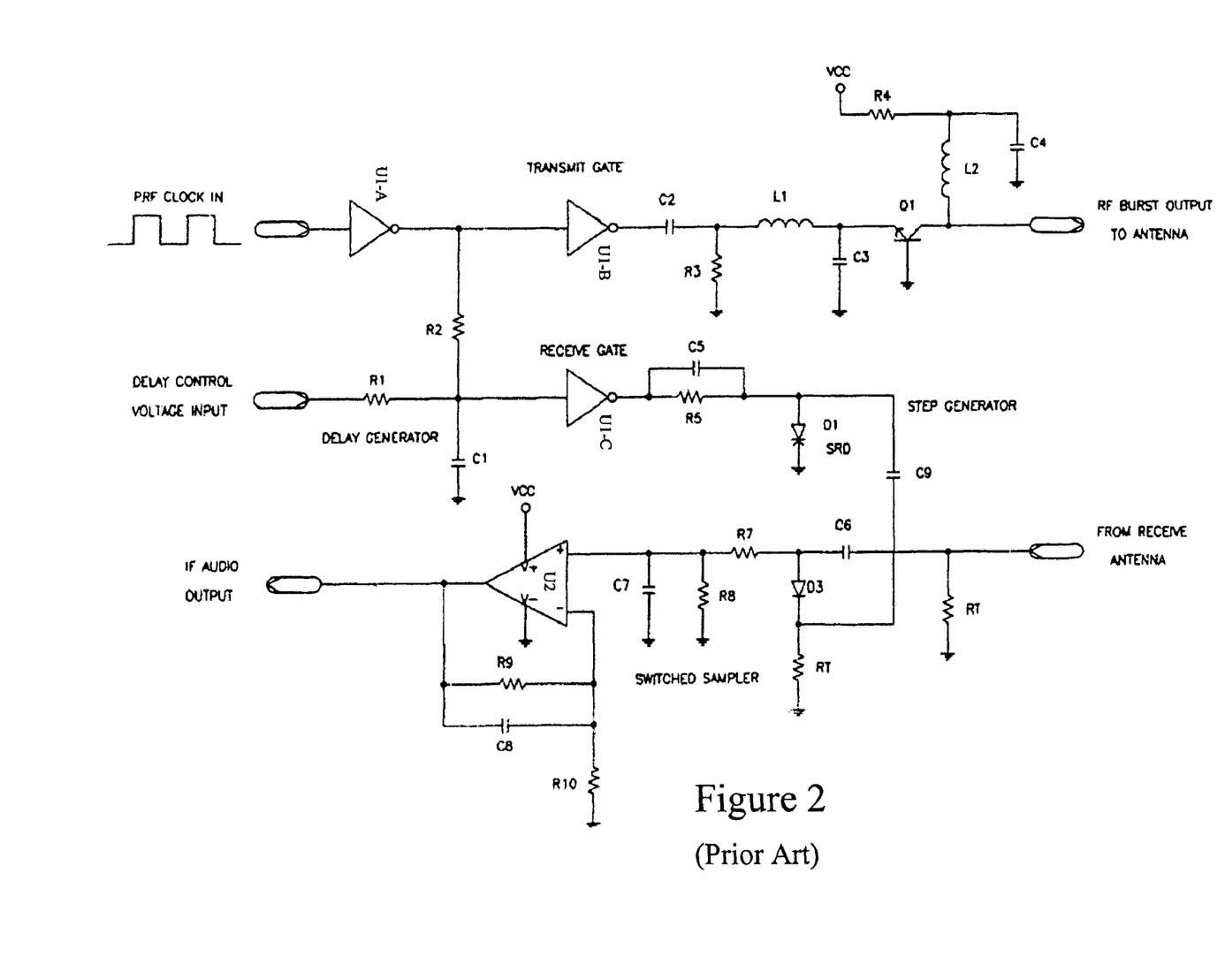
FIG. 2: Schematic diagram of LLNL licensed integrated-sampling based radar.

One preferred embodiment of the invention incorporates existing technology for frequency down-converting an RF carrier, using integrated sampling. The basic technique is licensed by Lawrence Livermore National Laboratories for commercial development of a wide-variety of radar-related devices. FIG. 1 is a functional block diagram illustrating the key elements of the licensed technology as used in this invention. FIG. 2 shows electrical schematic realizations of the functional blocks as shown in U.S. Pat. Nos. 5,345,471, 5,361,070, and 5,661,385.

Block 1 represents the fundamental pulse-repetition-frequency (PRF) clock for the radar system. This PRF clock is shown to be a square wave feeding into inverter U1-A in FIG. 2. Functional block 2 is the RF transmit gate for the radar, which is seen to be simply another inverter gate, U1-B, in FIG. 2. Block 3 represents the creation of the RF transmit radar pulse. This pulse is created as an RF burst resulting from the action of circuit components C2, R3, C3, L1, Q1, L2, R4 and C4 when gated by the square-wave output of U1-B in FIG. 2. The radar pulse is then fed to the radar transmit antenna 4, which is appropriately selected for the chosen frequency of operation and bandwidth of the RF burst. If necessary, attenuation may be added (not shown) just prior to the transmit antenna 4 to meet regulatory requirements (i.e., FCC Title 47, Part 15). A resistive "T" or "Pi" configuration may be used, and is well known to those skilled in the art of high frequency electronics, as is the proper selection of antenna type and configuration best suited for the particular RF carrier frequency and pulse width selected for any particular embodiment.

Functional block 5 creates a sliding delay in the Receiver Gate 6 in order to allow for range resolution of the received radar pulse signals (echoes from objects). Components R1, R2 and C1 in FIG. 2 create a very simple, but very effective circuit for accomplishing a controllable, precise Receiver Gate 6 delay relative the Transmit Gate 2. Components R2 and C1 are all that is necessary to create a fixed delay of the Receiver Gate U1-C relative to the Transmit pulse. Component R1 allows for the realization of a dynamically controllable delay function created by scaling the contribution of a variable Delay Control Voltage fed into R1. Voltage waveforms and component values are typically determined via an empirical process to achieve particular desired results.

Receiver Gate 6 (U1-C) drives the sampling Step Generator 7 which in turn drives the Switched Sampler 8 to accomplish the integrated-sampling down-conversion of the RF pulsed carrier to the desired intermediate frequency (IF). In FIG. 2 the Step Generator 7 consists of components R5, C5, D1 and C9. The output of the Step Generator 7 is a very narrow negative pulse created by properly driving the step recovery diode D1. When the step diode D1 "snaps" off very quickly, a negative pulse is coupled via C9 to the Switched Sampler 8 consisting of RT, C6, D3, R7, R8 and C7. The very narrow pulse briefly turns on D3 and charges C6 for a portion of the RF echo carrier cycle. This action creates a single "sample" of the RF echo. Optimum timing for the Step Generator driving the Switched Sampler has been found to be about ½ of the RF carrier period. Odd multiples of ½-period have also been found to be effective.

When D3 returns to its nominal off state, the charge on C6 transfers to C7 via R7. A sample is taken once every PRF clock, so the time constant of R7 and C7 is chosen to be less than the PRF clock to accomplish charge transfer during each PRF period. The time constant of C7 and R8 is selected to be much larger than the PRF clock to maintain the accumulated charge samples between PRF clock cycles, but less than the intermediate frequency to allow the sampler to properly respond to echo changes. Note that the resistors RT are selected to impedance match the receiver antenna 9.

Note that it may be desirable to first boost the received RF echo signal level by inserting one or more RF amplifier stages (not shown) between the Receiver Antenna 9 and the Switched Sampler 8. Many appropriate options are available to achieve this RF amplification and are well known to those skilled in the art of high frequency electronics.

Components U2, R9, C8 and R10 of FIG. 2 form the IF Buffer and Pre-Amplifier block 10. This is a simple operational amplifier circuit with gain equal to the ratio of R9/R10 for frequencies where the impedance of C8 is much greater than R9. C8 is selected properly so that it may be used as a high-frequency filter element reducing amplifier gain as the impedance of C8 becomes small for frequencies much higher than the IF.

The realized IF frequency is a function of the sliding receiver gate delay, and to some extent, the RF carrier and the PRF as well. The PRF determines how often samples of the RF carrier are taken, but the primary determinant of the IF is the sliding delay function. The sliding delay determines the rate-of-change of the relative timing when samples are taken of the radar echoes. In a static situation where the radar and any echo-producing objects are not moving, the transmit pulse is the same every PRF clock cycle, and therefore the radar echo is also the same every PRF clock cycle. A sliding delay function "slides" the sampler along the time-static radar-echo-waveform and reconstructs the radar echo on a sample-by-sample basis at an expanded time scale. The IF is therefore essentially defined by how fast the sliding occurs along the echo's time scale.

A smooth, sliding delay is accomplished by feeding a ramp voltage into R1 causing a small incremental delay in each subsequent sample initiated by the Receiver Gate 6. This delay is always relative to the Transmit Gate 2, which occurs once each PRF clock cycle. Optimal shaping of the ramp is dependent upon the range to be searched and the values of the other delay control components R1, R2 and C1.

If there is relative motion between the radar and echoed objects, then the sliding sample adds to the relative "motion" of the echo waveform, and the resulting IF is shifted accordingly in frequency (Doppler shift). Accurate time-scaled reconstruction of the RF carrier using integrated sampling holds true as long as the radar echo is consistent (coherent) during the integrated sampling time period so that subsequent samples add coherently to the prior samples. In human terms, coherency will almost always occur for ordinary objects and ordinary motion because the radar echo off the object will remain constant in any 10's to 100's of milliseconds time frame, allowing thousands to millions of samples to be taken and added constructively.

A unique property that arises from this integrated sampling technique is that the RF carrier is accurately reconstructed at the IF frequency, typically selected to be in the audio frequency range. This property is a significant feature of the present invention because the amplitude, phase, propagation delay, and Doppler characteristics of the echoed waveform are preserved and directly time-scaled. It should be noted that any other method of downconverting the RF radar echo to audio can also be used without deviating from the spirit and intent of this invention.

The scaling of the propagation delay is a particularly significant advantage in the preferred embodiment of the present invention because the speed of light propagation of the RF carrier scales to approximately speed-of-sound propagation timing when down-converted to audio frequencies. For example, it is known that an RF carrier propagates at the speed of light, $3 \times 10^8$ meters/second, and sound propagates on the order of 330 meters/second. If the sliding delay is configured such that a time scaling of about 900,000 occurs via the integrated sampling, then the RF propagation scales to exactly the speed of sound where the human ear is already accustomed to hearing small relative delays to discern direction and distance. For a 5.8 GHz carrier, a scaling of 900,000 results in an audio frequency output of 6.4 KHz. In practice the scaling factor may be chosen to be larger to both reduce the audio frequency to a more pleasant tone and to further enhance the delay effect to some degree.

Integrated sampling down-conversion of the RF carrier when processed carefully in accordance with this invention allows the processing power inherent in the human brain to be used to "hear" subtleties in the down-converted radar echo. The human brain can act as its own sophisticated "signal processor" for the radar echoes. Distance, direction and relative motion should be discernable. With practice, the user may even learn to distinguish echo characteristics of differing objects.

Figure 3:
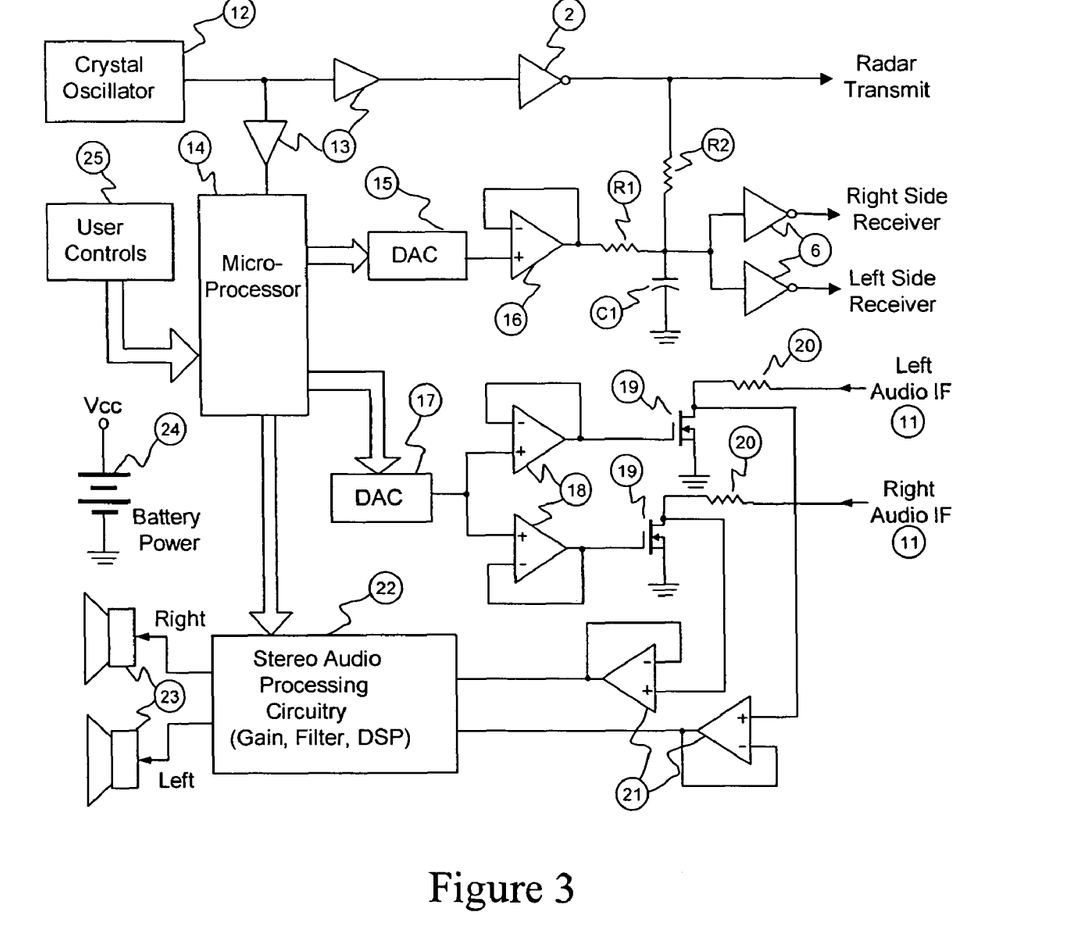
FIG. 3: Functional schematic diagram of one embodiment of the present invention.
Figure 4:
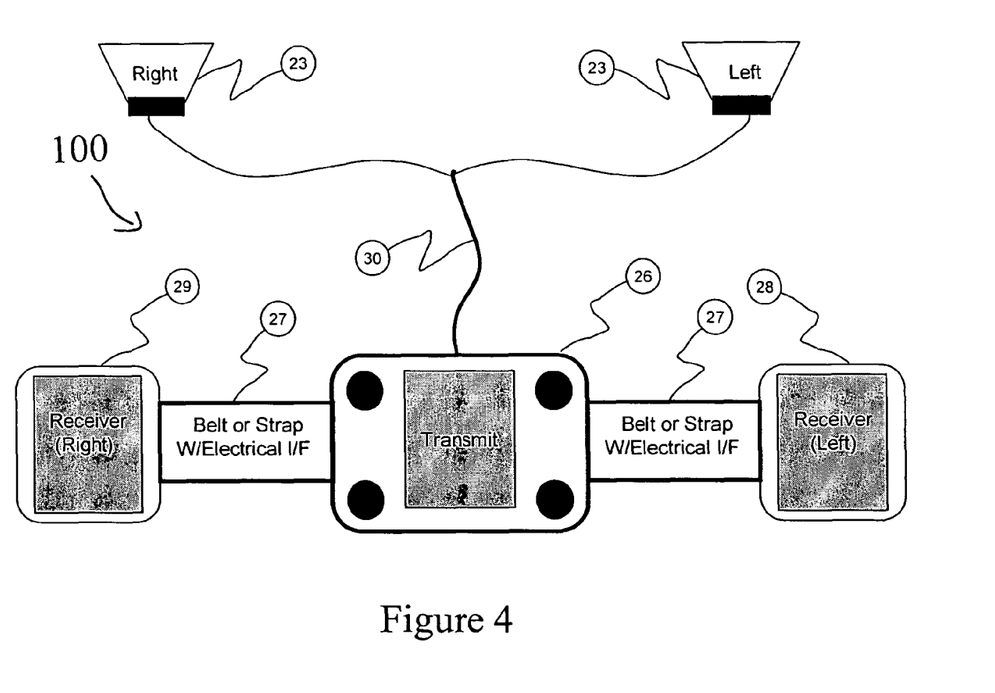
FIG. 4: Functional form factor for one belt-like garment embodiment of the present invention.

FIG. 3 illustrates one embodiment of the present invention, a Radar Visual Assistance Device, in a functional block schematic format, and FIG. 4 illustrates a preferred form factor for this Visual Assistance system. All functional blocks in FIG. 3 are common in the field of electronics, and may be applied in accordance with the skill of the practitioner and in accordance with the restrictions described herein. FIG. 3 represents one preferred embodiment, but should not be construed as the simplest embodiment nor the embodiment with maximum possible feature set. The same is true for the preferred form factor illustrated in FIG. 4.

The Visual Assistance system is controlled via embedded microprocessor 14. The microprocessor provides maximum design flexibility and customization potential via software changes rather than hardware changes. In the embodiment shown, the microprocessor shares the radar system clock 1 derived from a simple crystal oscillator 12 and buffered by 13 to drive both sections of circuitry (radar portion and microprocessor). It can be seen in FIG. 1 that for the radar portion of the invention, the PRF clock 1 drives a single pulsed radar transmitter via Transmit Gate 2 as previously described and two identical integrated-sampling radar receivers of the types previously described. Although the LLNL technology discussed above was originally invented in relation to ultrawide-band (UWB) radar, the present invention may be applied to wideband, narrowband, and even continuous wave (CW) radar devices.

In the embodiment shown in FIG. 3, the microprocessor 14 is used to drive a digital-to-analog converter (DAC) 15 to create the sliding delay control voltage. The DAC output is buffered by unity gain op-amp 16 to feed delay control circuitry R1, R2, and C1. Other methods of providing a variable delay control voltage are possible and may be applied by those skilled in the art. This circuitry now drives two identical radar receiver gates 6 which in turn drive two identical integrated-sampling receivers as previously described. Identical electrical gating delay for the two radar receivers is very important in order to accurately preserve the relative 3-dimensional propagation delay for the radar echo.

Microprocessor 14 also drives DAC 17, which is buffered by unity gain op-amps 18 to provide two identical control voltages to a simple type of attenuator consisting of MOSFET transistors 19 and resistors 20. MOSFET transistors 19 are driven in the "ohmic" region (saturation region) to realize a voltage-controlled resistor thus providing a voltage-controlled resistor divider attenuation network when used with resistors 20. Other time-adjustable attenuator configurations are possible and may be applied by those skilled in the art.

The attenuator portion of the circuit is used to adjust the gain of the received IF signal 11 over time to compensate for the fall off of the radiated energy as the square of distance, or the fall off of the echoed energy in proportion to the inverse of range to the fourth power. The attenuation is typically high at the beginning of the range sweep and low at the end of the range sweep because the echo return energy is expected to be very high at the beginning relative to the energy received at the end of the range sweep occurring from objects further away.

In the embodiment of FIG. 3, the output of the attenuators 19-20 is buffered by unity gain op-amps 21, which feed into the Stereo Audio Processing Circuitry 22. There are a great many options available to the practitioner in this portion of the invention because the art of stereo audio electronics is quite advanced. In one preferred embodiment, 22 will consist of a stereo CODEC device and a digital signal processor device to provide programmable audio filtering, proprietary audio signal enhancement, and perhaps some user-controllable audio features. In a simpler embodiment, 22 might consist of just an audio filter stage with gain and drive sufficient to directly drive the speakers 23.

The processed stereo signal from 22 is fed to a pair of speakers, or other sound transducers, 23. The speakers 23 may be in the form of stereo headphones, or preferably in the form of small speakers worn on the body near each ear, but not covering the ear, so that the user is afforded maximum normal hearing sensitivity.

The entire system is battery operated 24, preferably by a high-energy rechargeable battery source to provide several hours of function between recharge cycles.

User controls 25 such as on/off, volume control, and other possible user selectable features (see Table 1) are fed to the microprocessor 14 in this embodiment. In this manner the microprocessor 14 can assume complete control over all radar and audio processing functions. For example, audio volume selection might be adjusted via either a signal to the DSP in 22 or by adjusting the Attenuators at DAC 17. On/off function could simply consist of a very low-power sleep mode. More conventional means of controlling these features such as a SPST switch for on/off control and potentiometers for volume might be used according to the practitioner's preferences.

Figure 5:
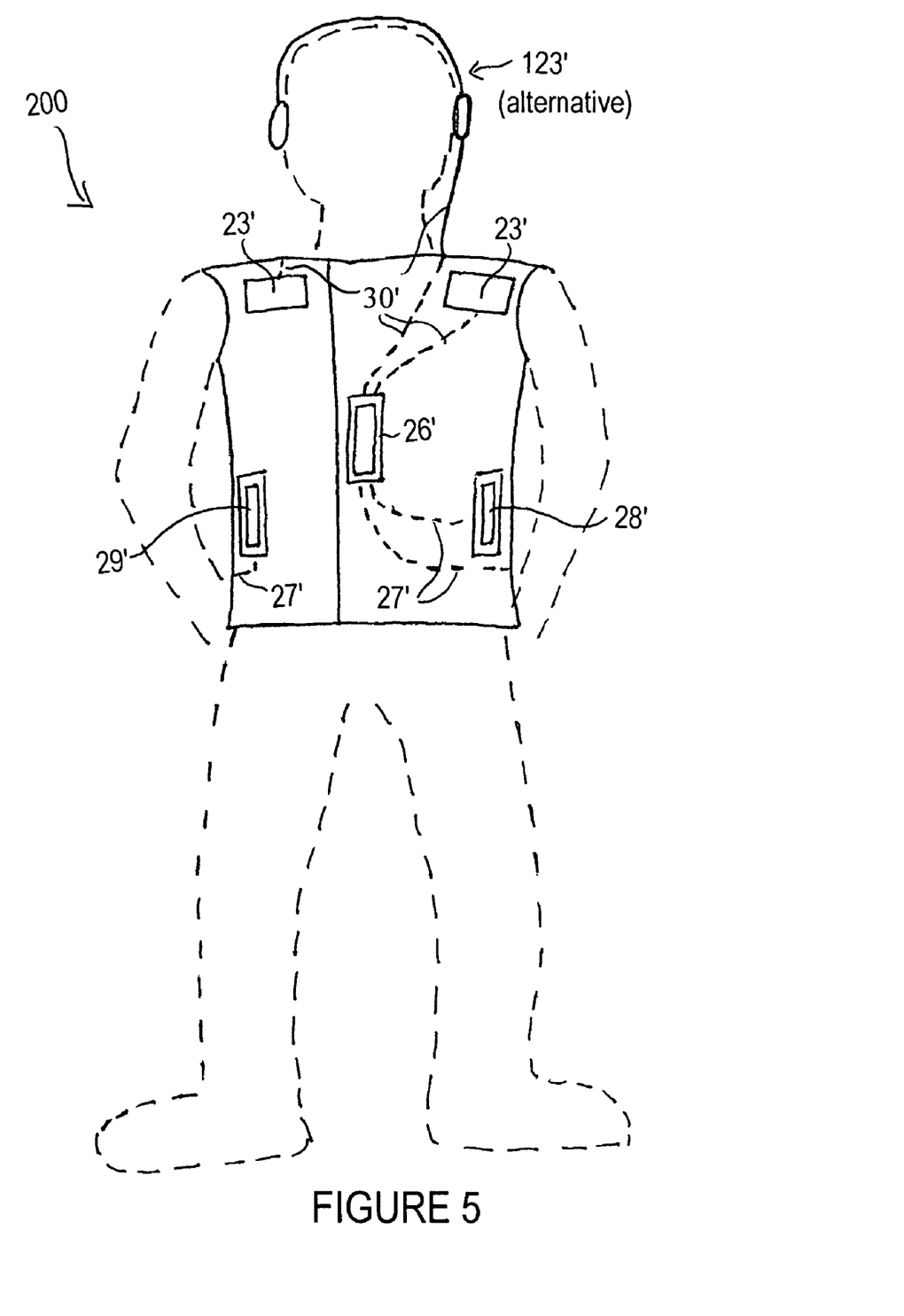
FIG. 5: Functional form factor for one vest-like garment embodiment of the present invention.

A complete Radar Visual Assistance system is illustrated in two, but not all, alternative embodiments in FIG. 4 (a waist belt embodiment 100) and FIG. 5 (a vest embodiment 200) which represent two preferred form factors. The primary control unit 26 and 26' houses the batteries, the user controls, the processing circuitry, and the radar pulse transmitter. The control unit 26 and 26' is centrally located to radiate the transmit pulse symmetrically outward with respect to the user's "head-on" or front-facing perspective.

The control unit 26 and 26' feeds power and identical radar receiver gate clocks via belt 27 or via internal vest wiring 27' to the left radar receiver 28 and 28' and identical right radar receiver 29 and 29'. Radar receivers 28 and 28' and 29 and 29' are nominally spaced some distance apart, the distance being greater than or equal to the nominal spacing of ears on the human head. Since the integrated sampling technique scales the radar pulse propagation time to essentially the speed of sound, the relative delay between each receiver produces a 3-dimensional effect familiar to the human brain.

The vest-type configuration 200 may be a preferable alternative to the belt embodiment 100 illustrated. In all form factors, it is crucial that the radar gating electrical delay is kept identical to each receiver 28 and 28' and 29 and 29' in order to preserve the proper relative echo propagation delay for each receiver 28 and 28' and 29 and 29' when converted to audio via integrated sampling. Likewise, audio gain must be identical in each IF to speaker path. It may be desirable to factory calibrate the audio gain portion of the circuitry for system response to a nominal "head-on" object.

Finally, the control unit 26 and 26' feeds the processed, finished audio stereo signal to the speakers 23 and 23' via cable 30 and 30'. Cable 30 and 30' and speakers 23 and 23' may be embedded into the vest configuration near the user's shoulders as shown in FIG. 5, or may be embodied as a headphone system 123' shown as an alternative speaker configuration in FIG. 5. Other user-friendly alternative configurations may be used as desired.

The invention has a great many design parameters which are adjustable to create differing effects in the finished audio stereo output. Many of these adjustable parameters might be incorporated as user controls to allow the user to customize the performance to their own liking. User controls could be implemented via the microprocessor 14 and stereo audio processing circuitry 22 to provide some sort of audible feedback for particular selections to assist the visually impaired with making desired selections. Table 1 summarizes many of the parameters which might be adjusted, and briefly describes the effect produced and how they could be embodied. The description should be sufficient for those skilled in the art of electronics to be able to implement these features into various embodiments of the invention.

TABLE 1

Adjustable Design Parameters

| Parameter Description | Implementation | Effect to User |
|---|---|---|
| Range Sweep Rate | Microprocessor control of the delay voltage | Adjust max range; adjust repetition rate |
| Audio Tone or Frequency | DSP algorithm, audio filtering | Tonal preferences, enhance or modify tone versus range relationship |
| Delay Control Voltage Profile | Microprocessor adjusts DAC algorithm | Creates tonal shift and/or max range adjustment |
| Attenuation Profile | Microprocessor adjusts DAC algorithm | Adjusts relative amplitude of near versus far objects |

Although this invention has been described above with reference to particular means, materials and embodiments, it is to be understood that the invention is not limited to these disclosed particulars, but extends instead to all equivalents within the scope of the following claims.

I claim:

1. An echolocater with audio output, comprising:
   a radar transmitter;
   two identical, spaced-apart radar receivers;
   said receivers being adapted to down-convert and replicate a radar echo from the radar transmitter, by integrated sampling of the echo without the use of mixer or local oscillator components, so that the complete amplitude, phase and Doppler characteristics of the echo, including propagation delay, are preserved and time-scaled from the speed-of-light propagation of the radar transmitter to approximately speed-of-sound after the down-conversion via integrated sampling, and provide audio output of said complete, down-converted echo, and,
   two identical spaced-apart sound transducers for receiving the audio output.

2. The echolocater of claim 1 wherein the two sound transducers are speakers.

3. The echolocater of claim 1 which is body-worn.

4. The echolocater of claim 3 which is a belt-like garment.

5. The echolocater of claim 3 which is a vest-like garment.

* * * * *